Figure 1:
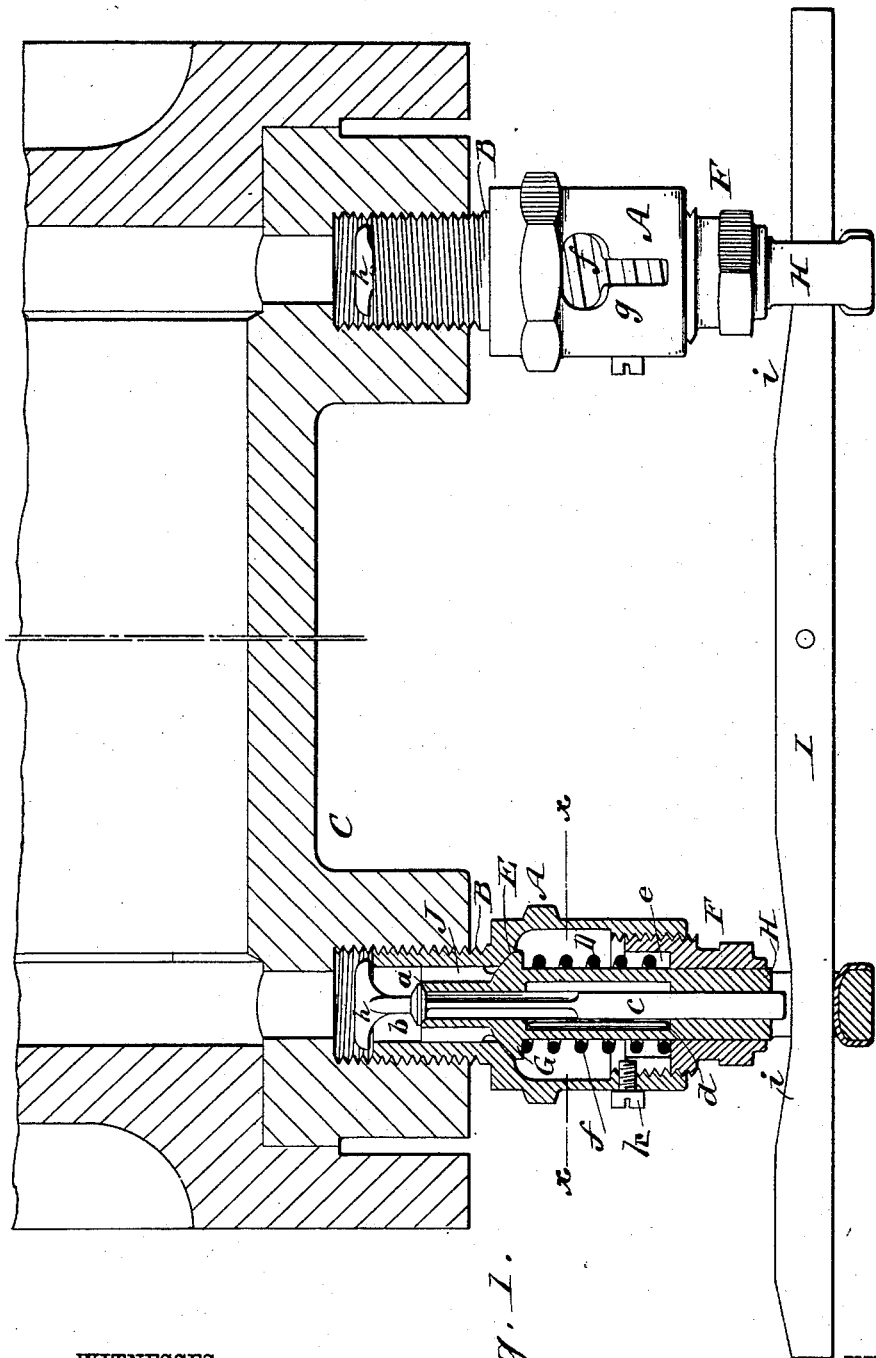

(No Model.) 2 Sheets—Sheet 1.

W. VIELHABER.
RELIEF VALVE FOR ENGINE CYLINDERS.

No. 367,563. Patented Aug. 2, 1887.

WITNESSES:
INVENTOR:
W. Vielhaber
BY Munn & Co.
ATTORNEYS.

(No Model.) 2 Sheets—Sheet 2.
W. VIELHABER.
RELIEF VALVE FOR ENGINE CYLINDERS.
No. 367,563. Patented Aug. 2, 1887.
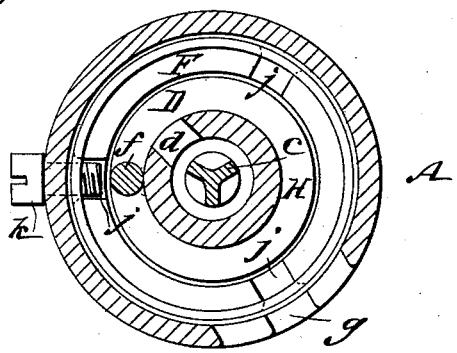
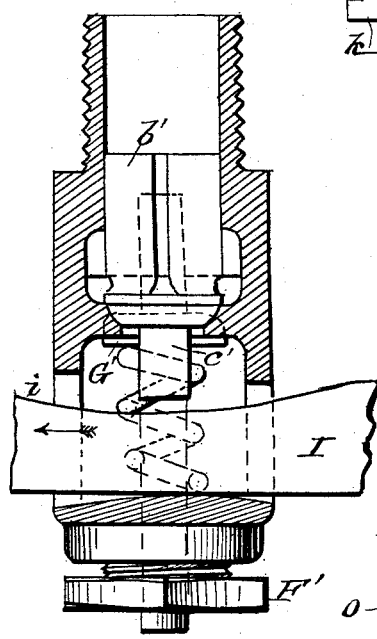
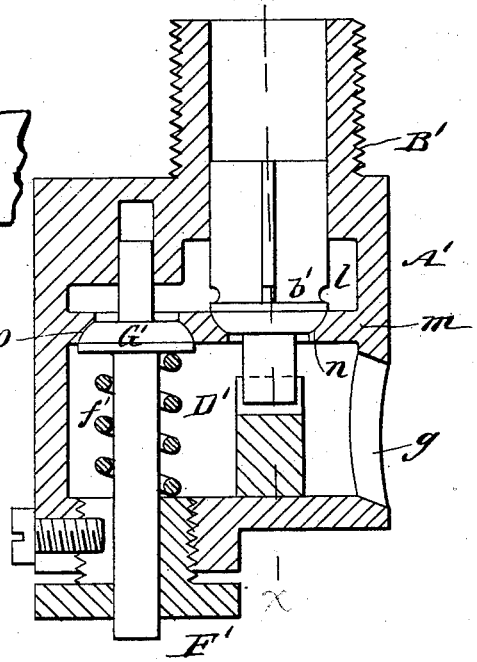
WITNESSES:
INVENTOR:
W. Vielhaber
BY Munn & Co.
ATTORNEYS.

UNITED STATES PATENT OFFICE.

WALTER VIELHABER, OF ALTOONA, PENNSYLVANIA.

RELIEF-VALVE FOR ENGINE-CYLINDERS.

SPECIFICATION forming part of Letters Patent No. 367,563, dated August 2, 1887.

Application filed September 27, 1886. Serial No. 214,656. (No model.)

*To all whom it may concern:*

Be it known that I, WALTER VIELHABER, of Altoona, in the county of Blair and State of Pennsylvania, have invented a new and Improved Relief-Valve for Engine-Cylinders, of which the following is a specification, reference being had to the annexed drawings, forming a part thereof, in which—

Figure 1 is a side sectional elevation of an engine-cylinder with my improved relief-valve applied. Fig. 2 is a horizontal section taken on line $x\,x$ in Fig. 1. Fig. 3 is a longitudinal section of a modified form of relief-valve, and Fig. 4 is a section on line $x\,x$ of Fig. 3.

Similar letters of reference indicate corresponding parts in all the views.

The object of my invention is to provide a valve for application to engine-cylinders, that can be opened from the cab of the engine by the usual hand lever or rod, but which will open automatically when the pressure of the water increases beyond the prescribed limit.

My invention consists in the peculiar construction and arrangement of parts, as hereinafter fully described, and pointed out in the claims.

The valve-casing A is provided with a threaded tubular extension, B, which enters the hole in the bottom of the engine-cylinder C and communicates with the interior of the cylinder. In the casing A is formed a chamber, D, which is larger than the bore of the tubular extension B, and in which, adjoining the said tubular extension, is formed a spherical valve-seat, E. To the lower end of the casing A is fitted the valve-stem guide and spring-support F, which screws into the casing A.

To the valve-seat E is fitted a valve, G, provided with a tubular stem, H, which projects downward through the part F, and is mortised below the said part to receive the bar I. The valve above its seat is provided with the usual guiding-wings, J, and the inner end of the valve-stem is provided with a valve-seat, $a$, to which is fitted a valve, $b$, whose stem $c$ projects into the mortise of the stem H of the valve G. The central part of the stem H is chambered and provided with one or more slots, $d$, communicating with the chamber D around the said stem.

In the chamber D, between the back of the valve G and the bottom of the annular cavity $e$ in the part F, is located a spiral spring, $f$, which is placed under sufficient compression by screwing inward the part F to prevent the valve G from leaving its seat under the ordinary working-pressure of the engine-cylinder; but the spring is capable of yielding when the valve G is subjected to extraordinary pressure.

The casing A is provided with a discharge-opening, $g$, which allows the water passing either of the valves G $b$ to escape from the casing. The inner end of the stem of the valve $b$ is provided with a cross-bar, $h$, which engages the inner end of the tubular extension B whenever the valve G is moved outward, causing the valve $b$ to leave its seat $a$. Below the valve $b$ the stem $c$ is fluted to permit of the escape of water to the chamber in the valve-stem H. It will thus be seen that whenever water accumulates in the engine-cylinder the extraordinary pressure exerted on the valve G will cause it and also the valve $b$ to open automatically, and thus allow the water to escape.

The bar I is provided with inclined surfaces $i$, which engage the lower end of the valve-stem $c$ when the said bar is pulled through the mortises of the stems H. The bar I is connected in any convenient way with a lever or handle in the cab of the locomotive, so that the engineer or fireman may open the valve $b$ by sliding the bar I.

The part F is provided with three radial holes, $j$, for receiving the inner end of a set-screw, $k$, which projects through the casing A and is designed to prevent the part F from changing its adjustment.

In the device shown in Fig. 3 the casing A' is provided with a chamber, $l$, communicating through the tubular extension B' with the interior of the cylinder. The chamber $l$ is separated from the chamber D' by a horizontal partition, $m$, in which are formed two valve-seats, $n\,o$. To the valve-seat $n$, which is in the upper surface of the partition, is fitted a valve, $b'$, which opens toward the engine-cylinder; and to the valve-seat $o$, which is in the under surface of the partition $m$, is fitted a valve, G', which opens outward and is held to its seat by the spring $f'$, which abuts upon the adjustable bushing F' and presses against the back of the valve, the compression of the spring $f'$ being sufficient to resist the ordinary working-pressure of the steam-cylinder.

The valve $l'$ is operated by the bar I, the same as in Fig. 1, the bar in this case sliding in the chamber D' beneath the valve-stem $c'$.

Having thus fully described my invention, I claim as new and desire to secure by Letters Patent—

1. The combination, with the valve-casing A, provided with the chamber D, of the outwardly-opening valve G, having a tubular stem, H, the spring $f$, surrounding the stem and arranged to hold the valve to its seat, and the valve $b$, fitted to the seat in the inner end of the stem H and arranged to be operated independently of the outwardly-opening valve, substantially as described.

2. In a relief-valve for engine-cylinders, the combination of the casing A, provided with the chamber D, the valve G, having a tubular stem, H, extending through and below the chamber and apertured transversely outside of the chamber, as described, the spring $f$, surrounding the tubular stem and arranged to press the valve G to its seat, the valve $b$, seated on the inner end of the tubular stem H and provided with the stem $c$, extending into the transverse aperture of the stem H, and the sliding cam-bar I, for raising the valve $b$, substantially as described.

3. In a relief-valve for engine-cylinders, the combination, with a valve-casing and an outwardly-opening and spring-pressed valve, G, having a tubular stem, H, provided with a valve-seat, $a$, on its inner end, of the valve $b$, fitted to said seat and having the inner end of its stem provided with the cross-bar $h$, substantially as herein shown and described.

WALTER VIELHABER.

Witnesses:
WILLIS E. HALL,
GEO. R. HENDERSON.